(12) United States Patent
Branover et al.

(10) Patent No.: US 8,793,512 B2
(45) Date of Patent: Jul. 29, 2014

(54) METHOD AND APPARATUS FOR THERMAL CONTROL OF PROCESSING NODES

(75) Inventors: Alexander Branover, Chestnut Hill, MA (US); Samuel D. Naffziger, Fort Collins, CO (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 326 days.

(21) Appl. No.: 12/915,361

(22) Filed: Oct. 29, 2010

(65) Prior Publication Data

US 2012/0110352 A1     May 3, 2012

(51) Int. Cl.
*G01K 1/00*       (2006.01)
*G01K 7/00*       (2006.01)

(52) U.S. Cl.
USPC ........... 713/300; 702/130; 702/131; 702/132; 327/512; 327/513

(58) Field of Classification Search
USPC ........... 713/300; 327/512, 513; 702/130, 131, 702/132
See application file for complete search history.

(56) References Cited

U.S. PATENT DOCUMENTS

| | | | |
|---|---|---|---|
| 6,172,611 B1 | 1/2001 | Hussain et al. | |
| 7,552,346 B2 | 6/2009 | Aguilar, Jr. | |
| 7,802,120 B2 | 9/2010 | Conroy | |
| 7,882,369 B1 | 2/2011 | Kelleher | |
| 7,886,164 B1 | 2/2011 | Alben | |
| 8,356,197 B2* | 1/2013 | Allarey et al. | 713/322 |
| 2006/0161375 A1* | 7/2006 | Duberstein et al. | 702/132 |
| 2007/0156370 A1* | 7/2007 | White et al. | 702/132 |
| 2008/0005592 A1* | 1/2008 | Allarey et al. | 713/300 |
| 2008/0028244 A1* | 1/2008 | Capps et al. | 713/324 |
| 2008/0168287 A1* | 7/2008 | Berry et al. | 713/323 |
| 2009/0235108 A1* | 9/2009 | Gold et al. | 713/500 |
| 2010/0064162 A1* | 3/2010 | Rotem et al. | 713/340 |
| 2010/0073068 A1* | 3/2010 | Cho et al. | 327/513 |
| 2011/0022857 A1* | 1/2011 | Nussbaum et al. | 713/300 |
| 2011/0191602 A1* | 8/2011 | Bearden et al. | 713/300 |
| 2012/0066535 A1* | 3/2012 | Naffziger | 713/340 |
| 2012/0072749 A1* | 3/2012 | Conroy et al. | 713/322 |

FOREIGN PATENT DOCUMENTS

| | | |
|---|---|---|
| WO | WO 2006/073899 | 7/2006 |
| WO | WO 2009/114141 | 9/2009 |

OTHER PUBLICATIONS

Atienza, et al.; "Inducing Thermal-Awareness in Multicore Systems Using Networks-on-Chip"; VLSI, 2009. ISVLSI '09. IEEE Computer Society Annual Symposium on, IEEE, Piscataway, NJ, USA; May 13, 2009; pp. 187-192.
International Search Report and Written Opinion Application No. PCT/US2011/057640 mailed Feb. 6, 2011.

\* cited by examiner

*Primary Examiner* — Vincent Tran
(74) *Attorney, Agent, or Firm* — Rory D. Rankin; Meyertons, Hood, Kivlin, Kowert & Goetzel, P.C.

(57) ABSTRACT

An apparatus and method for per-node thermal control of processing nodes is disclosed. The apparatus includes a plurality of processing nodes, and further includes a power management unit configured to set a first frequency limit for at least one of the plurality of processing nodes responsive to receiving an indication of a first detected temperature greater than a first temperature threshold, wherein the first detected temperature is associated with the one of the plurality of processing nodes. The power management unit is further configured to set a second frequency limit for each of the plurality of processing nodes responsive to receiving an indication of a second temperature greater than a second temperature threshold.

27 Claims, 12 Drawing Sheets

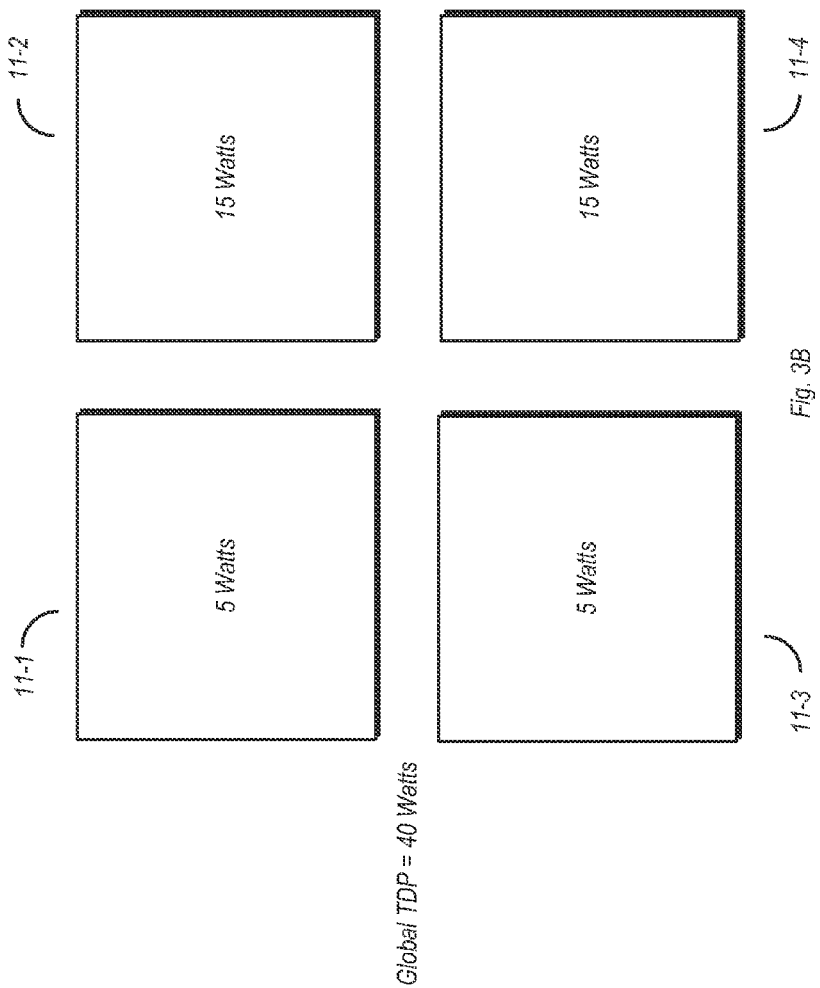

3 Cores Idle, 1 Core Active
F_max = 3.6 GHz 11-1: 7 Watts
11-2: 7 Watts
11-3: 7 Watts
11-4: 19 Watts Global TDP = 40 Watts

METHOD AND APPARATUS FOR THERMAL CONTROL OF PROCESSING NODES

BACKGROUND

1. Field of the Invention

This invention relates to integrated circuits, and more particularly, to thermal control of integrated circuits.

2. Description of the Related Art

During the design of a processor or other type of integrated circuit (IC), many factors must be considered. Typically, factors such as performance are balanced with other factors such as power consumption. Another factor that affects the design of many IC's is thermal output. Many IC's may generate a significant amount of heat during operation. Left unchecked, the heat generated during operation of an IC can cause damage or complete failure.

To prevent heat-related damage, many IC's employ some form of thermal control apparatus. In various embodiments, a thermal control apparatus in an IC may include one or more temperature sensors at various locations, and a control unit. The control unit may receive temperature indications from the various sensors, and compare these indications to one or more temperature thresholds. In the event that the temperature reported from one of the temperature sensors exceeds a threshold, operation of the IC may be scaled back to prevent further temperature increases. Scaling back the performance of the IC may be accomplished by reducing a supply voltage provided thereto, reducing a clock frequency, both, or by some other method (e.g., reducing, limiting, or re-allocating a workload of the IC). The IC may be held in the reduced performance state until the temperature falls below the threshold, and additionally for a period of time thereafter.

The temperature threshold at which performance is reduced may be based on a parameter known as thermal design power (TDP), which may be defined as the amount of power that may be dissipated by the IC (or cooling system thereof) without exceeding a specified maximum temperature of the IC itself. TDP may be set based on a specified ambient temperature. For example, the TDP of an IC may be specified for an ambient temperature of 35° C. That is, power consumption may be enabled up to an amount that would cause overheating (as determined by the maximum specified IC temperature) at an ambient temperature (e.g., room temperature) of 35° C. The maximum temperature may thus be specified as a temperature on the IC die in which TDP can no longer be dissipated. Power consumption, and thus performance may thus be reduced when this temperature is reached.

SUMMARY OF EMBODIMENTS OF THE DISCLOSURE

An apparatus and method for per-node thermal control of processing nodes is disclosed. In one embodiment, a system includes a plurality of processing nodes. The system further includes a power management unit configured to set a first frequency limit for at least one of the plurality of processing nodes responsive receiving an indication of a first detected temperature being greater than or equal to a first temperature threshold, wherein the first temperature threshold is associated with the one of the plurality of processing nodes. The power management unit is further configured to set a second frequency limit for each of the plurality of processing nodes responsive to receiving an indication of a second temperature being greater than a second temperature threshold.

In one embodiment, a method for per-node thermal control of processing nodes includes setting a first frequency limit for at least one of a plurality of processing nodes responsive to receiving an indication of a first detected temperature being greater than or equal to a first temperature threshold, wherein the first detected temperature is associate with the one of the plurality of processing nodes. The method further includes setting a second frequency limit for each of the plurality of processing nodes responsive to receiving an indication of a second temperature being greater than a second temperature threshold.

BRIEF DESCRIPTION OF THE DRAWINGS

Other aspects of the invention will become apparent upon reading the following detailed description and upon reference to the accompanying drawings in which:

FIG. 3B is a block diagram illustrating thermal design power allocation in a second situation for one embodiment of a multi-core processor;

Figure 1:
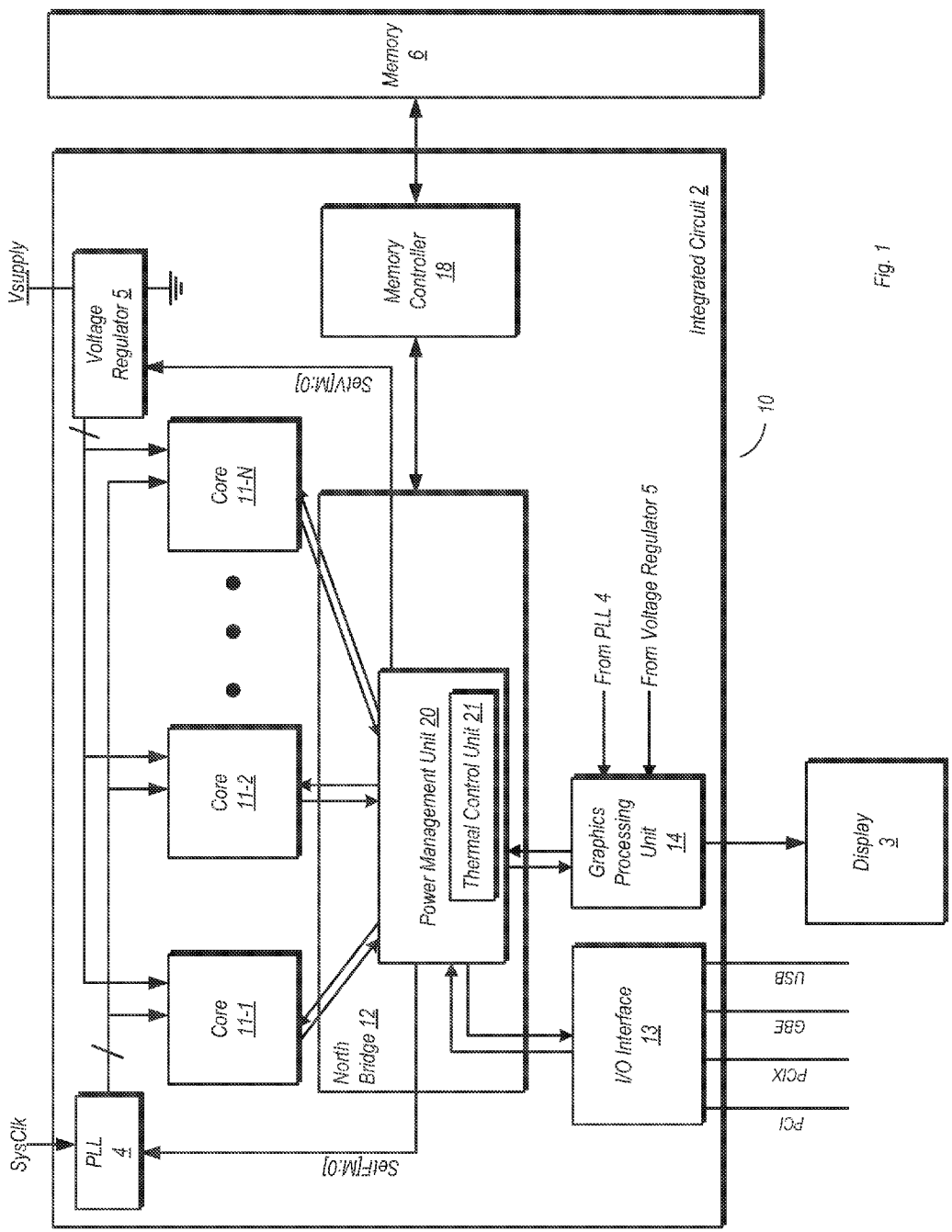
FIG. 1 is a block diagram of one embodiment of an integrated circuit (IC) system on a chip (SOC)

While the invention is susceptible to various modifications and alternative forms, specific embodiments thereof are shown by way of example in the drawings and will herein be described in detail. It should be understood, however, that the drawings and description thereto are not intended to limit the invention to the particular form disclosed, but, on the contrary, the invention is to cover all modifications, equivalents, and alternatives falling within the spirit and scope of the present invention as defined by the appended claims.

DETAILED DESCRIPTION

Overview

A method an apparatus for per-node thermal control (PNTC) of a multi-core processor will now be discussed in greater detail. While the discussion is directed to processors having a plurality of processor cores (which may include a graphics processing unit), the various method and apparatus embodiments discussed herein may be more broadly applied to any integrated circuit (IC) having multiple functional units. Accordingly, discussion of the various method and apparatus embodiments herein is intended to be exemplary, but not limiting. For the purposes of this disclosure, a processing node may be defined as any type of functional unit that performs processing, such as a processor core of a general-purpose computer processor, a graphics processing unit, or other type of processing circuitry. Furthermore, the method and apparatus discussed herein may be applied to IC's having multiple different types of processing nodes on the same IC die.

The use of PNTC may allow for a greater performance-per-watt of a processor or other IC than exclusive use of a globally applied hardware thermal control (HTC). For example, a processor may be designed to have a global thermal design power (TDP) limit for the IC as a whole based on an ambient temperature of 35° C. That is, the TDP limit may be reached when an on-die temperature reaches a predetermined temperature threshold. Greater performance can be achieved by operating the processor using a TDP limit based on an ambient temperature of, for example, 28° C. This is due to the fact that the processor would have to operate at a higher clock frequency and/or operating voltage to reach the predetermined temperature threshold in ambient conditions of 28° C. since the surrounding air at the lower ambient temperature will dissipate heat at a greater rate than at the higher ambient temperature of 35° C. Accordingly, local (e.g., per core) TDP limits may be set based on the lower ambient temperature conditions. Furthermore, local TDP limits may be varied during operation. For example, the local TDP limit for an active processor core may be increased when one or more other processor cores are in an inactive state.

For the purposes of this disclosure, a global TDP limit may be defined as a limit, applied to an IC as a whole, as a maximum amount of power dissipation for which the IC is rated. The global TDP limit may be fixed for a given IC design. A local TDP limit may be defined as a TDP limit applied to the processing nodes/cores on a per-core or per-processing node basis, including to processor cores, a graphics processing unit, or any other functional unit in which a significant amount of heat may be generated. Furthermore, the local TDP limit for a given processing node may be varied based on the states of other processing nodes.

An operating point for the purposes of this disclosure may be defined as a clock frequency, and may also include an operating voltage (e.g., supply voltage provided to a functional unit). Increasing an operating point for a given functional unit may be defined as increasing the frequency of a clock signal provided to that unit, and may also include increasing its operating voltage. Similarly, decreasing an operating point for a given functional unit may be defined as decreasing the clock frequency, and may also include decreasing the operating voltage. Limiting an operating point may be defined as limiting the clock frequency and/or operating voltage to specified maximum values for particular set of conditions (but not necessarily maximum limits for all conditions). Thus, when an operating point is limited for a particular processing node, it may operate at a clock frequency and operating voltage up to the specified values for a current set of conditions, but may also operate at clock frequency and operating voltage values that are less than the specified values.

Using PNTC, a threshold temperature may be set slightly lower than the temperature threshold used for determining when the global TDP limit has been reached. For example, if the threshold temperature for the global TDP limit is 100° C., the temperature threshold for determining when a local TDP limit has been reached may be 96° C. Temperatures of each of the processor cores may be monitored, and if the temperature of a given core reaches this limit, the given core may be throttled by a first amount. For example, in embodiments that conform to the Advanced Configuration and Power Interface (ACPI) specification, the core may be throttled to 90% of the clock frequency of the P0 state (e.g., P0 state clock at 2.0 GHz, core throttled to 1.8 GHz). In addition to throttling the clock frequency, a corresponding operating voltage reduction may also be performed for at least the given core (e.g., reducing the voltage from 1.1 volts to 1.0 volt if operating in the P0 state). In some embodiments, the operating point of the other processor cores may be limited to this operating point as well, although other embodiments are possible and contemplated wherein the operating point is not changed for the other cores. In embodiments where the operating point of all cores is limited responsive to one core reaching a local temperature threshold, other cores may be throttled as well if they are operating in, e.g., the P0 state or high operating point in general. Furthermore, in some embodiments, the processor cores may be coupled to separate, unique voltage planes, and thus their operating voltages may be controlled independent of the other processor cores. In other embodiments, the processor cores may share a voltage plane, with the operating voltage being set based on the operating point for the processor core having the highest local TDP limit.

If the temperature of the given core continues rising after throttling, a global throttling (HTC) may take place wherein all processor cores are throttled to a second operating point limit. More particularly, this may occur when the temperature at any point on the IC die of the processor reaches a global threshold temperature corresponding to the global TDP limit. When this occurs, the clock frequency for all processor cores may undergo a significant reduction through throttling, with the operating voltages also being reduced correspondingly. For example, in one ACPI-compliant embodiment, the processor cores may be throttled such that their clock frequency is limited to 1.0 GHz (where 2.0 GHz is the clock frequency for the P0 state in this embodiment), to the P3 state. Similarly, the operating voltage may also be reduced such that it is limited for all cores.

Local TDP limits for a given processor core may be variable, and may be increased or decreased depending on the state of the other processor cores. For example, in a quad-core processor, when two cores are power-gated (e.g., powered down), while a third core is in a sleep state, the TDP limit for the remaining core may be increased, since the other cores may dissipate some of the heat generated by this core. Since the core local TDP limit may be based on a lower ambient temperature (e.g., 28° C. as opposed to 35° C. for the global TDP limit), it may thus be increased to such a point as to enable overclocking, i.e. running its corresponding clock signal at a frequency higher than specified. For example, in one ACPI-compliant embodiment wherein the clock frequency in the P0 state is 2.0 GHz (and thus the maximum specified clock frequency), a core with a high local TDP limit may be clocked at a frequency greater than 2.0 GHz (e.g., at 3.6 GHz). This may result in greater performance for some processing workloads, particularly those that are compute-bounded. A compute-bounded workload may be defined as a processing workload that is computationally intensive, with infrequent (if any) accesses to main memory. It is noted however, that even if overclocking is enabled for a given processor core due to a high local TDP limit, it is not necessarily performed in all cases. For example, if a processor workload is memory-bounded (i.e. one in which frequent memory accesses are performed, causing corresponding pipeline stalls), overclocking typically does not provide any performance gain. Accordingly, a processor core having a high local TDP limit may nevertheless be operated at a lower clock frequency if processing a memory-bounded workload.

Processor with Power Management Unit:

FIG. 1 is a block diagram of one embodiment of an integrated circuit (IC) coupled to a memory. IC 2 and memory 6, along with display 3 and display memory 300, form at least a portion of computer system 10 in this example. In the embodiment shown, IC 2 is a processor having a number of processing nodes 11 (e.g., 11-1, 11-2, and so forth). It is noted that the methodology to be described herein may be applied to other arrangements, such as multi-processor computer systems implementing multiple processors (which may be single-core or multi-core processors) on separate, unique IC dies. In multi-core embodiments, processing nodes 11 may be identical to each other (i.e. homogonous multi-core), or one or more processing nodes 11 may be different from others (i.e. heterogeneous multi-core).

Processing nodes 11 may each include one or more execution units, cache memories, schedulers, branch prediction circuits, and so forth. Furthermore, each of processing nodes 11 may be configured to assert requests for access to memory 6, which may function as the main memory for computer system 10. Such requests may include read requests and/or write requests, and may be initially received from a respective processor core 11 by north bridge 12. Requests for access to memory 6 may be routed through memory controller 18 in the embodiment shown.

Each processor core 11 is coupled to north bridge 12 in the embodiment shown. North bridge 12 may provide a wide variety of interface functions for each of processing nodes 11, including interfaces to memory and to various peripherals. In addition to being coupled to each of processing nodes 11, north bridge 12 is also coupled to input/output (I/O) interface 13, graphics processing unit (GPU) 14, memory controller 18, phase-locked loop (PLL) 4, and voltage regulator 5. Additional functional units may also be included in some embodiments. North bridge 12 may serve as a communications hub for activity in computer system 10, routing and coordinating communications between processing nodes 11, memory 6 (via memory controller 18), display 3 (via GPU 14), and various peripheral devices (via I/O interface 13).

I/O interface 13 may function as a south bridge device in computer system 10. A number of different types of peripheral buses may be coupled to I/O interface 13. In this particular example, the bus types include a peripheral component interconnect (PCI) bus, a PCI-Extended (PCI-X), a PCIE (PCI Express) bus, a gigabit Ethernet (GBE) bus, and a universal serial bus (USB). However, these bus types are exemplary, and many other bus types may also be coupled to I/O interface 13. Peripheral devices may be coupled to some or all of the peripheral buses. Such peripheral devices include (but are not limited to) keyboards, mice, printers, scanners, joysticks or other types of game controllers, media recording devices, external storage devices, network interface cards, and so forth. At least some of the peripheral devices that may be coupled to I/O unit 13 via a corresponding peripheral bus may assert memory access requests using direct memory access (DMA). These requests (which may include read and write requests) may be conveyed to north bridge 12 via I/O interface 13, and may be routed to memory controller 18.

GPU 14 may perform video processing functions for computer system 10. Video processing functions performed by GPU 14 may include basic video rendering, as well as 3-D graphics and other types of complex graphics functions. The video information processed by GPU 14 may be output for display on display 3, which may be one of a number of different types of display units. Display 3 may be implemented as flat panel liquid crystal display (LCD), a light-emitting diode (LED) display, a plasma display, a cathode ray tube (CRT) display, or any other suitable type.

In the embodiment shown, GPU 14 may include a display buffer that may store data for display processing. The data for display processing may be read from memory 6, via memory controller 18 and north bridge 12. Accordingly, GPU 14 may be configured for direct memory access (DMA) of memory 6 for updating frames and filling the display buffer.

In the embodiment shown, north bridge 12 includes a power management unit 20 that is configured to manage the power consumption of each of processing nodes 11 based on their respective activity levels or workloads, as will be discussed in further detail below. Furthermore, in multi-core (or multi-processor) embodiments, power management unit 20 may set the operating points of the individual processing nodes 11 independent of one another. Thus, while a first processor core 11 may operate at a first operating point, a second processor core 11 may operate at a second operating point different than the first. Since GPU 14 may consume a significant amount of power (and generate a significant amount of heat), its respective operating point may also be controlled by power management unit 20 in the same manner as the operating points of processing nodes 11. Accordingly, the discussion below directed to setting a local TDP limit and controlling the operating point of a given one of processing nodes 11 may also apply to GPU 14.

Power management unit 20 in the embodiment shown also includes a thermal control unit 21. The setting of operating points by power management unit 20 may be performed at least in part based on operations performed by thermal control unit 21. In one embodiment, thermal control unit 21 may monitor temperature information received from each of the processing nodes 11 (and from graphics processing unit 14, which will be discussed below) in order to determine whether IC 2 is operating within a global TDP power limit (hereinafter referred to as a global power limit). Furthermore, thermal control unit 21 may also set and vary local TDP limits (hereinafter local power limits) for each of the processing cores 11. For example, in an embodiment having four processing nodes 11, if all four processing nodes 11 are active and processing a workload, their respective local power limits may be set to equal values. However, if two processing nodes 11 are active while the other two are in an idle state, the local power limits for the active nodes may be increased with the local power limits for the idle nodes may be decreased correspondingly. In both of these, as well as other cases, the local power limits for processing nodes 11 may such that the global power limit is not exceeded.

Thermal control unit 21 may also receive temperature information from each of processing nodes 11. The temperature information received may be used for determining whether the processing nodes 11 are operating within their respective local power limits. For example, thermal control unit 21 may compare a reported temperature of a given processor core 11 to a temperature threshold value that is based on its current local power limit. If the temperature is greater than or equal to the threshold temperature, power management unit 20 may respond by performing a limited throttling of the reporting processor core 11. The limited throttling may comprise a small reduction in the operating clock frequency for the reporting processor core 11, and may also include a limited voltage reduction. The operating point of that processor core 11 may be limited thereafter for a time at least until the temperature has fallen below the threshold. Additional time may be allowed for the temperature to allow for additional heat to be dissipated before removing the operating point limit.

In some embodiments, the limiting of the operating point may be performed on a per-node basis, applying only to the processor core 11 in which the temperature exceeded the threshold. In other embodiments, all processing nodes 11 may be limited to the same operating point of the processor core 11 for which the temperature threshold was exceeded. The operating point may be limited by limiting the frequency of the clock signal provided to the processing nodes 11. Further limiting of the operating point may be accomplished by limiting the operating voltage provided to the processing nodes 11.

Thermal control unit 21 may also be configured to determine whether IC 2 as a whole is operating within a global power limit. In addition to receiving temperature information from processing nodes 11, thermal control unit 21 may receive the same from each of the other functional units, as well as from other functional units that may be present in other embodiments. If a temperature reading from any functional unit (or from any point on IC 2) exceeds a second temperature threshold, power management unit 20 may respond by globally throttling IC 2. Globally throttling may be defined by a significant reduction in clock frequency to each of processing nodes 11, and may be applied to the other functional units of IC2 as well. Furthermore, the operating voltage for each of processor core 11 may also be significantly reduced as well. The operating point for all processing nodes 11 subsequent to global throttling may be limited at least until all temperatures reported to thermal control unit 21 are below the second threshold, and may be limited for a specified time thereafter to allow IC 2 to further cool down.

In the embodiment shown, IC 2 includes a phase-locked loop (PLL) 4 coupled to receive a system clock signal. PLL 4 may distribute corresponding clock signals to each of processing nodes 11 and to GPU 14. In this embodiment, the clock signals received by each of processing nodes 11 and GPU 14 are independent of one another. Furthermore, PLL 4 in this embodiment is configured to individually control and alter the frequency of each of the clock signals provided to respective ones of processing nodes 11, independently of one another. PLL 4 may also control and alter the frequency of the clock signal provided to GPU 14 independently of processing nodes 11. As will be discussed in further detail below, the frequency of the clock signal received by any given one of processing nodes 11 may be increased or decreased in accordance with a variable local power limit, temperature values reported therefrom, and performance demands imposed thereupon. The various frequencies at which clock signals may be output from PLL 4 may correspond to different operating points for each of processing nodes 11. Accordingly, a change of operating point for a particular one of processing nodes 11 may be put into effect by changing the frequency of its respectively received clock signal.

In the case where changing the respective operating points of one or more processing nodes 11 includes the changing of one or more respective clock frequencies, power management unit 20 may change the state of digital signals SetF [M:0] provided to PLL 4. This set of digital signals may contain information for setting the clock frequency for each functional unit coupled to PLL 4. Responsive to the change in these signals, PLL 4 may change the clock frequency of the affected functional units.

In the embodiment shown, IC 2 also includes voltage regulator 5. In other embodiments, voltage regulator 5 may be implemented separately from IC 2. Voltage regulator 5 may provide a operating voltage (or supply voltage) to each of processing nodes 11. In some embodiments, voltage regulator 5 may provide an operating voltage that is variable according to a particular operating point (e.g., increased for greater performance, decreased for greater power savings). In some embodiments, each of processing nodes 11 may share a voltage plane. Thus, each processor core 11 in such an embodiment operates at the same voltage as the other ones of processing nodes 11. In another embodiment, voltage planes are not shared, and thus the supply voltage received by each processor core 11 may be set and adjusted independently of the respective supply voltages received by other ones of processing nodes 11. Thus, operating point adjustments that include adjustments of an operating voltage may be selectively applied to each processor core 11 independently of the others in embodiments having non-shared voltage planes. In the case where changing the operating point includes changing an operating voltage for one or more processing nodes 11, power management unit 20 may change the state of digital signals SetV[M:0] provided to voltage regulator 5. Responsive to the change in the signals SetV[M:0], voltage regulator 5 may adjust the operating voltage provided to the affected ones of processing nodes 11. GPU 14 may share a voltage plane with one or more of processing nodes 11 in some embodiments, while having its own voltage plane in other nodes, and may also have its supply voltage adjusted accordingly.

As noted above, operating points for each of processing nodes 11 may be set or limited based on reported temperatures, variable local power limits, and a fixed global power limit. In addition, operating points for each of processing nodes 11 may also be set in accordance with a respective activity level (e.g., processing workload). In the embodiment shown, power management unit 20 may receive information indicating the activity level for each of processing nodes 11, and may set the operating point accordingly, within local and global power limits. Power management unit 20 may also set the operating point of a given processing node based on a particular type of workload. Generally speaking, a processor core 11 executing a compute-bounded workload may be set to a higher operating point, or to a lower operating point when executing a memory-bounded workload. For workloads that are neither compute-bounded or memory-bounded, a processor core 11 may be set to an intermediate operating point. Activity levels and types of workloads may be determined by power management unit 20 based on various metrics, such as committed instructions per second, memory access requests, cache hits/misses, pipeline stalls, branch mispredictions, instructions issued, instructions executed, and so forth.

As previously noted, an operating point of a processor core 11 may be defined by at least a clock frequency, and may also be defined by an operating voltage. Generally speaking, transitioning to a "higher" operating point may be defined by increasing the clock frequency for the affected processor core 11. Transitioning to a higher operating point may also include increasing its operating voltage. Similarly, transitioning to a "lower" operating point may be defined by decreasing the clock frequency for the affected processor core 11. A decrease in the operating voltage provided to an affected processor core 11 may also be included in the definition of transitioning to a lower operating point.

In one embodiment, the operating points may correspond to performance states (hereinafter 'P-states') of the Advanced Configuration and Power Interface (ACPI) specification. Table 1 below lists P-states for one embodiment implemented using the ACPI standard.

TABLE 1

| P-state index | Frequency | Voltage |
|---|---|---|
| P0 | 2 GHz | 1.1 V |
| P1 | 1.8 GHz | 1.0 V |
| P2 | 1.5 GHz | 0.9 V |
| P3 | 1 GHz | 0.85 V |
| P4 | 800 MHz | 0.8 V |

The P-states listed in Table 1 above may be applied when an ACPI-compliant processor is operating in a non-idle state known as C0. For an embodiment corresponding to Table 1 above, P-state P0 is the highest operating point, having a clock frequency of 2 GHz and an operating voltage of 1.1 volts. Power management unit 20 in one embodiment may cause a processor core 11 to operate at P-state P0 responsive to a high activity level when permitted by a current local power limit. Operation in P-state P0 may be utilized for processing workloads that are compute-bounded. A compute-bounded workload may be time sensitive and computationally intensive, requiring few (if any) memory accesses. It may be desirable to execute the workload in the shortest time possible to maintain maximum performance while also enabling a quicker return to an idle state commensurate with lower power consumption. Therefore, compute-bounded workloads having a high activity level may be executed in P-state P0, which may enable faster completion.

P-state P4 is the lowest operating point in this particular embodiment, having a clock frequency of 800 MHz and an operating voltage of 0.8V. Power management unit 20 may cause a processor core 11 to operate in P-state P4 responsive to a low activity level, even if higher P-states would fall within a current local power limit. P-state P4 may be used with memory-bounded workloads as well as with other tasks that are not time-sensitive (or frequency-sensitive). Memory-bounded workloads are those which include frequent accesses to system memory. Since memory accesses involve large latencies (in comparison with the execution times of instructions that do not access memory), reducing the clock frequency for memory-bounded workloads may have a minimal performance impact and with power savings that may improve the performance-per-watt metric of the system.

If a detected activity level is greater than the low activity threshold and less than the high activity threshold, operation of the corresponding processor core 11 may be set to any one of P-states P1, P2, P3, under direction of an OS, other software, firmware, and/or other hardware, depending on the specific embodiment and providing that operation in these P-states falls within current local power limits.

It is noted that the P-states listed in Table 1 are an exemplary set of operating points. Embodiments that use operating points having different clock frequencies and operating voltages are possible and contemplated. Further, as previously noted above, some embodiments may utilize a shared voltage plane for processing nodes 11, and thus their respective operating points may be defined on the basis of a clock frequency. In some embodiments, the operating voltage for each of the processing nodes may either remain fixed, while in other embodiments, the operating voltage may be adjusted for all processing nodes 11 at the same time. It is also noted that the operating points listed as P-states in Table 1 above may also be utilized with non-ACPI embodiments.

Furthermore, even in ACPI embodiments, the operating points listed above may not be all encompassing when PNTC is utilized. More particularly, in some cases, a performance boost beyond the P0 state may be applied to a given processor core 11 when appropriate for the processing workload and permitted by a current local power limit. For example, consider a situation wherein a given one of processing nodes 11 is executing a compute-bounded workload while the remaining ones of processing nodes 11 are in an idle state. In such a case, the local power limit for the idle processing nodes may be reduced, while the local power limit for the active processor core 11 may be increased. The increase in the local power limit may thus enable overclocking for the active processor core 11. Accordingly, since the active processor core 11 is executing a compute-bounded workload in this example, the frequency of the clock signal provided thereto may be increased to a value that is greater than that for the P0 state. This in turn may enable faster execution of the compute-bounded workload, and may be performed while allowing IC 2 to remain within the global power limit if the ambient temperature is low enough. Furthermore, if the ambient temperature is less than the value upon which the local power limit is based, overclocking the active processor core 11 may enable faster execution of the compute-bounded workload without the possibility of throttling. This type of deterministic performance may lead to greater performance-per-watt in low ambient temperature environments.

Figure 2:
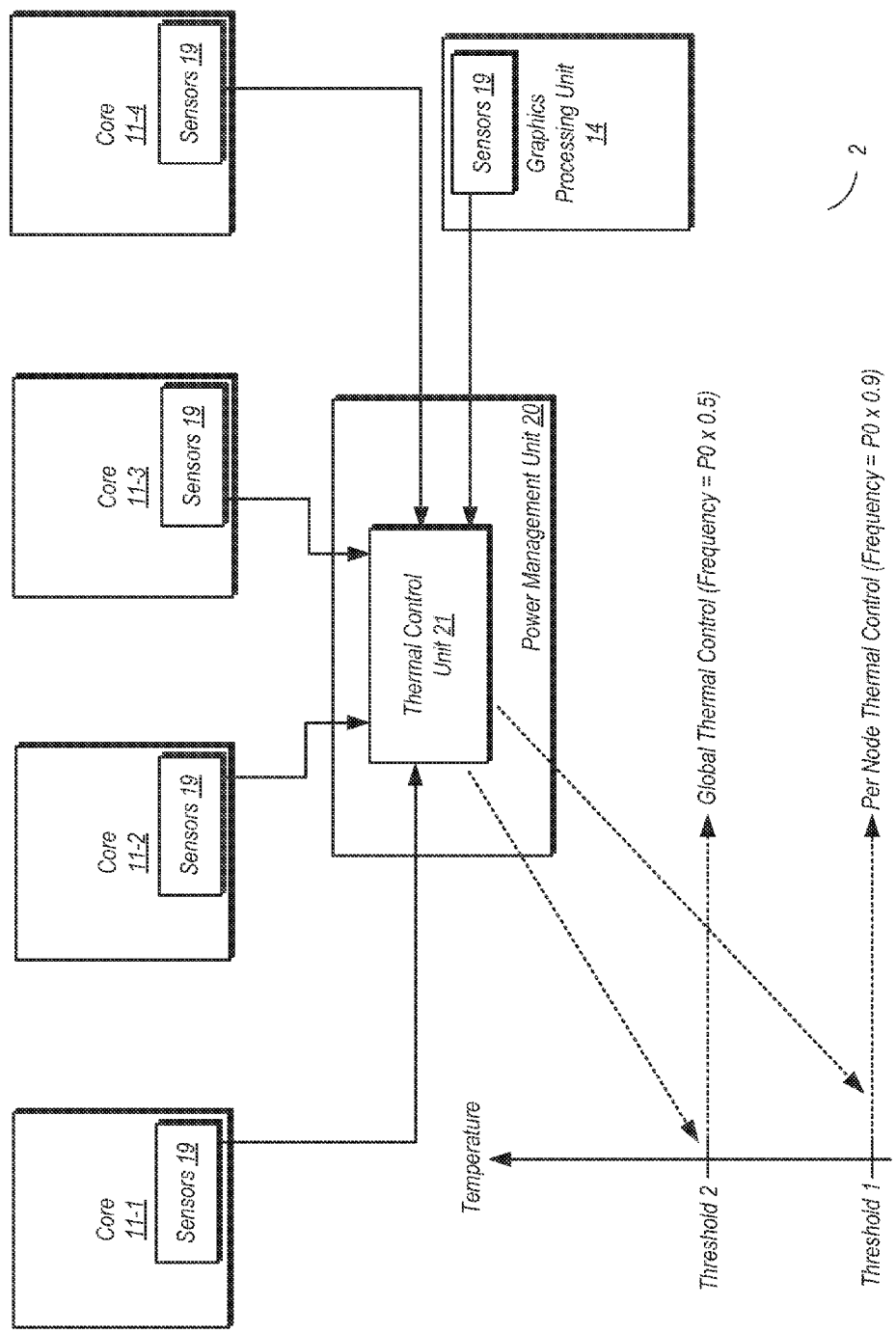
FIG. 2 is a block diagram of one embodiment of a multi-core processor including a thermal control unit.

Global and Local Thermal Design Power (TDP):

FIG. 2 is a block diagram of one embodiment of a multi-core processor including a thermal control unit. More particularly, FIG. 2 illustrates the functional relationship between the various processing nodes 11, GPU 14, and thermal control unit 21. FIG. 2 also includes a graph illustrating the difference in system response based on local power limits (which may be variable and applied to functional units on an individual basis) and a global power limit (which may be fixed and applied to the IC as a whole).

In the embodiment shown, IC 2 includes four processing cores 11 (i.e., cores 11-1 to 11-4) and a GPU 14 each coupled to thermal control unit 21 of power management unit 20. Each of processing cores 11 and GPU 14 may occupy a certain portion of the area of the die of IC 2. Furthermore, each of processing cores 11 and GPU 14 in the embodiment shown includes one or more sensors 19, each of which is configured to sense temperature within their respective units. In some embodiments, multiple instances of sensor 19 may be placed in various locations throughout area of the IC die upon which each functional unit is implemented. In some embodiments, each sensor 19 may be coupled to report a respectively sensed temperature to thermal control unit 21. In other embodiments, each functional unit may be configured to report only the highest measured temperature for that functional unit.

Sensors 19 may be implemented in a variety of ways. In one embodiment, sensors 19 may be implemented as ring oscillator based temperature sensors. The ring oscillator in such temperatures may output a signal having a certain frequency, with the frequency increasing as temperature increases, and vice versa. Temperature sensors that output a voltage or current that is proportional to the measured temperature are also possible and contemplated. In another embodiment, temperature values may be extrapolated from other information, such as an executed code stream or signals generated during operation.

Thermal control unit 21 may compare the temperatures received from each of the functional units to a first temperature threshold and a second temperature threshold, as shown in the graph accompanying the block diagram in FIG. 2. The first temperature threshold may be used in performing thermal control on a per node basis (PNTC), while the second temperature threshold may be used in performing thermal control on a global basis (HTC). In the embodiment shown, the first temperature threshold is less than the second temperature threshold. Example values of the first and second temperature thresholds are 96° C. and 100° C., respectively. Furthermore, the first temperature threshold may be based on a first ambient temperature (e.g., 28° C.) and a maximum local power limit. The second temperature threshold may be based on a second ambient temperature (e.g., 35° C.) and a global power limit. A temperature reading that is greater than the first temperature threshold may indicate that the reporting processing core 11 is exceeding it local power limit. A temperature reading that is greater than the second temperature threshold value may indicate that IC 2 as a whole is exceeding its global power limit.

In the embodiment shown, if a given one of processor cores 11 reports a temperature that is equal to or greater than the first threshold temperature, the reporting processor core 11 may be throttled. More particularly, the clock frequency of the reporting processor core 11 may be reduced to a specified level responsive to thermal control unit 21 determining that its temperature is greater than or equal to the first temperature threshold. In one ACPI-compliant embodiment, the clock frequency of at least the reporting processor core 11 may be reduced to 90% of the frequency of the P0 state. Furthermore, the clock frequency of the reporting processor core 11 may be limited to this operating point at least until its corresponding reported temperature falls below the first threshold, and may remain there for an additional amount of time to allow for additional cooling.

In some embodiments, other ones of processor cores 11 that are active may also be limited in operating point to 90% of the frequency of the P0 state responsive to the one processor core 11 reporting a temperature that is greater than or equal to the first temperature threshold. Embodiments are possible and contemplated wherein the other active processor cores 11 are not limited in operating point when one particular processor core 11 reports a temperature greater than or equal to the first temperature threshold.

In the embodiment shown, if thermal control unit 21 receives a reported temperature value from any processor cores that is equal to or greater than the second temperature threshold, power management unit 20 may respond by globally throttling all active processor cores 11. In one ACPI-compliant embodiment, as illustrated by the accompanying graph, the clock frequency for active processor cores 11 may be throttled to 50% of the frequency of the P0 state. Active processor cores 11 that are already operating at a clock frequency of less than that of 50% of the P0 state may continue to operate as before. However, all processor cores 11 may be limited to an operating point in which the clock frequency is no more than 50% that of the P0 state.

In addition to limiting the clock frequency responsive to a reported temperature meeting or exceeding the second temperature threshold, the operating voltage for each of processor cores 11 may also be limited. Referring back to Table 1, a clock frequency that is 50% of the frequency of the P0 state corresponds to the P3 state for that particular embodiment. The operating voltage in the P3 state in Table 1 is 0.85 volts (1.1. volts for the P0 state). Accordingly, in split-voltage plane embodiments (i.e. each processing core 11 has its own voltage plane), the operating voltage for any processor cores 11 operating at a voltage above that of the P3 state may be reduced to 0.85 volts responsive to thermal control unit 21 determining that a reported temperature reading is at or above the second temperature threshold. In shared voltage plane embodiments (i.e. all processor cores 11 share the same voltage plane), the operating voltage for all processing cores 11 may be set to that of the P3 state. Similar operating voltage adjustments may be made in other embodiments, regardless of whether those embodiments are ACPI-compliant, and regardless of whether processor cores 11 utilize a shared voltage plane or separate voltage planes.

It is again noted that the throttling actions and the limiting of the operating point that is performed on processor cores 11 as described herein may also be applied to GPU 14.

Local TDP Distribution Using Per-Node Thermal Control:

FIGS. 3A-3F are block diagrams illustrating thermal design power allocation for various situations in an embodiment of a processor that utilizes PNTC. More particularly, FIGS. 3A-3F illustrate the local power limit distribution for the various processor cores 11 when each of the cores is in one of a number of various states of activity or idleness. It is noted that idleness for a given one of processor cores 11 may include a clock-gated state (i.e. in which power remains applied by the clock signal to the core is inhibited) and a power-gated state (i.e. when the clock signal is not provided to the core and power is removed therefrom).

It is noted that the examples of FIGS. 3A-3F do not include local power limits that are assigned to GPU 14. However, it is noted that FIGS. 3A-3F are presented for illustrative purposes, and that in various embodiments, a local power limit for a GPU such as GPU 14 may be assigned and varied using the same principles as discussed herein.

Figure 3A:
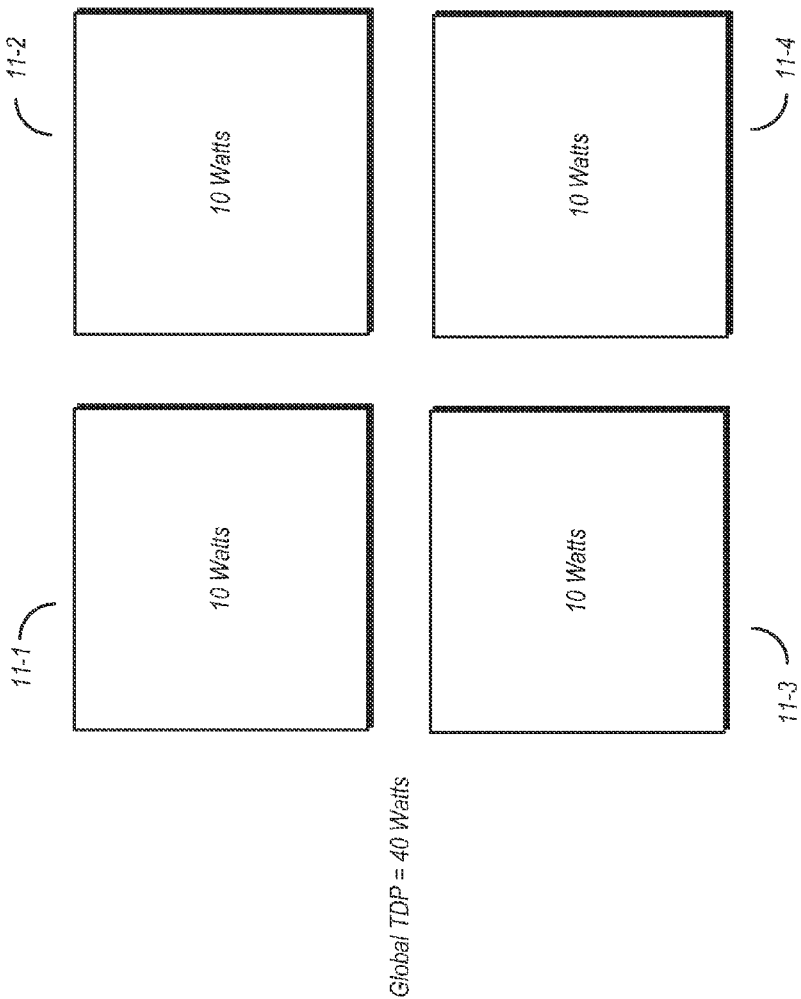
FIG. 3A is a block diagram illustrating thermal design power allocation in a first situation for one embodiment of a multi-core processor.

In FIG. 3A, all processor cores 11 are active and executing a processing workload. In the embodiment shown, the global power limit is 40 watts. Since each of the four-processor cores 11 in this embodiment is active, thermal control unit 21 may assign a local power limit of 10 watts to each, thereby evenly distributing local power limits. If the embodiment shown is an ACPI-compliant embodiment conforming the figures presented in Table 1 above, the maximum clock frequency for any of processor cores 11 may be 2.0 GHz, although intermittent boosts of up to 3.2 GHz may be permitted. Using the exemplary figure of 28° C. as an ambient temperature upon which the local power limit values are based, each of processor cores 11 may operate at 2.0 GHz with the intermittent boosts of 3.2 GHz in a deterministic, repeatable manner for environments in which the ambient temperature is less than 28° C. If the ambient temperature is greater than 28° C., the configuration shown in FIG. 3A may still be permitted, although some throttling (e.g., as described in reference to FIG. 2) may occur.

In FIG. 3B, two of processing cores 11 are idle, while the other two are active. The idle processor cores in this example may be clock-gated (i.e. the clock signal to these cores is inhibited) but not power-gated. Accordingly, the local power limit for the active cores may be set at 15 watts each. The 15 watt local power limit for the two active processor cores 11 may enable a performance boost via overclocking for these cores. In this particular example, each of the two active processor cores 11 may be operated at a clock frequency of up to 3.2 GHz. In low ambient environments (e.g., less than 28° C. for the exemplary embodiment discussed herein), operation of the two active cores may be accomplished without the need for throttling due to exceeding local or global power limits. In higher ambient temperature embodiments (e.g., 28° C. or above in the exemplary embodiment), operation of one or both of the active processor cores 11 at 3.2 GHz may result in some throttling.

It is noted that even when performance boosting is enabled for an active processor core 11, the actual clock frequency of operation may also depend on its processing workload. For example, if the processing workload for an active processor core in the example of FIG. 3B is compute-bounded, the clock frequency may be increased to 3.2 GHz. However, if the processing workload for an active processor core 11 in the example of FIG. 3B is memory-bounded (and thus not sensitive to the core clock frequency), the core may be operated as a significantly lower clock frequency, since increasing it in this situation would not result in any appreciable performance gain.

With respect to the clock-gated processor cores, the 5 watt local power limit for each of these may provide a margin of power should an event occur that causes one or both of these cores to enter an active state. Furthermore, the two idle processor cores 11 may act as a thermal sink with respect to the two active cores. In some embodiments, the assignment of local power limits to the various processor cores 11 may depend on the geometry of the layout on the IC die upon which the cores are implemented. For example, if an active core is located physically adjacent to an idle core, its local power limit may be greater than if it is located physically adjacent to another active core.

Figure 3C:
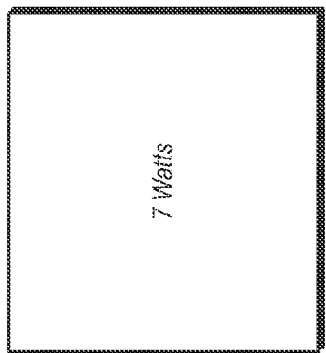
FIG. 3C is a block diagram illustrating thermal design power allocation in a third situation for one embodiment of a multi-core processor.
Figure 3C:
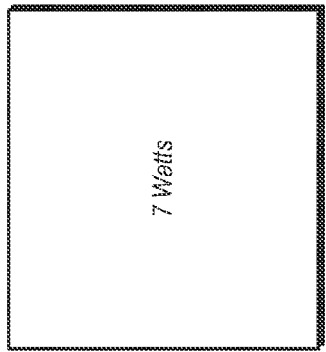
Figure 3C:
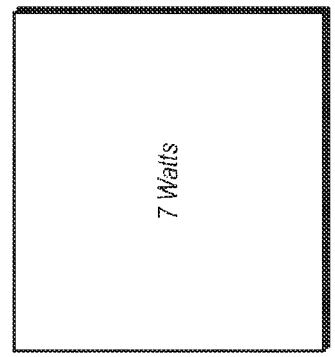

In the example of FIG. 3C, three of processor cores 11 are in an idle (clock-gated) state, while one of processor cores 11 is active. In this case, the active processor core 11 may be assigned a local power limit of 19 watts, and may be overclocked to a frequency of up to 3.6 GHz. At a clock frequency of 3.6 GHz, the active processor core 11 may operate within its assigned local power limit for ambient temperatures below a specified value (e.g., the 28° C. value mentioned above). Above the specified value, operating at a clock frequency of 3.6 GHz may result in some throttling of the active processor core 11.

Figure 3D:
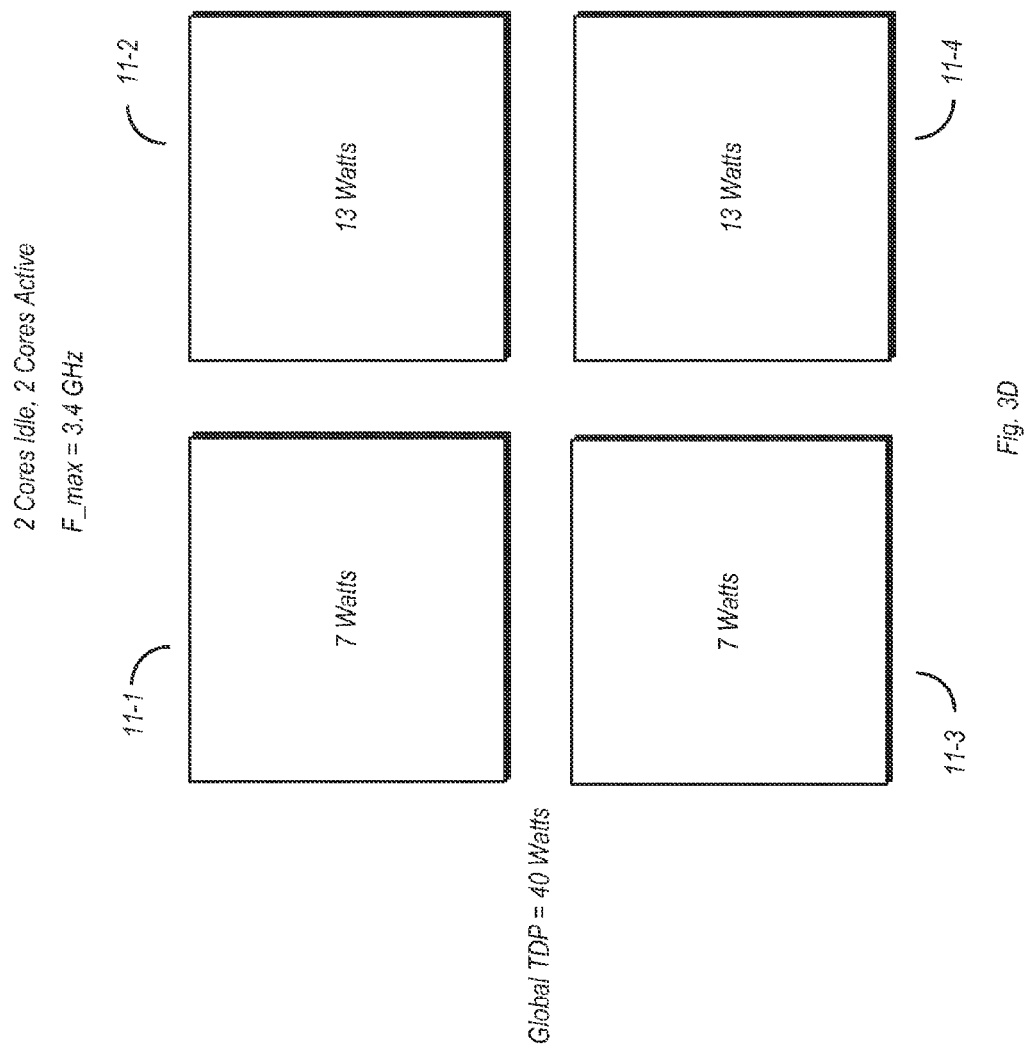
FIG. 3D is a block diagram illustrating thermal design power allocation in a fourth situation for one embodiment of a multi-core processor.

FIG. 3D illustrates a situation that is similar to that of FIG. 3B, wherein two processor cores 11 are idle, while the other two are active. For the active processor cores 11, a local power limit of 13 watts each may be assigned. The active processor cores 11 may operate at a clock frequency of up to 3.4 GHz in this example, compared to a maximum clock frequency of 3.2 GHz for the example of FIG. 3B.

The difference between the local power limit values in this example in comparison to the example of FIG. 3B may be a result of one or more of a number of different factors. One such factor is the layout geometry of the IC die upon which the processor cores 11 are implemented. For example, in the example shown in FIG. 3B, the two active processor cores 11 may each be physically adjacent to an idle processor core 11, but not to each other. In contrast, the two active processor cores 11 in the example of FIG. 3D may be physically adjacent to one another. Accordingly, in the example of FIG. 3B, the heat generated by the active processor cores 11 may be more easily dissipated than in the example of FIG. 3D.

The lower local power limits on the active processor cores 11 in the example of FIG. 3D in comparison to that of FIG. 3B may provide for tighter thermal control of each of the active cores 11. Thus, if operating in an environment with a high ambient temperature, thermal control unit 21 may be quicker to perform PNTC throttling (as discussed above in reference to FIG. 2) for the active cores 11 due to the lower local power limit relative to that of FIG. 3B. This may make it less likely that global (HTC) throttling (as also discussed above in reference to FIG. 2) will be necessary.

Figure 3E:
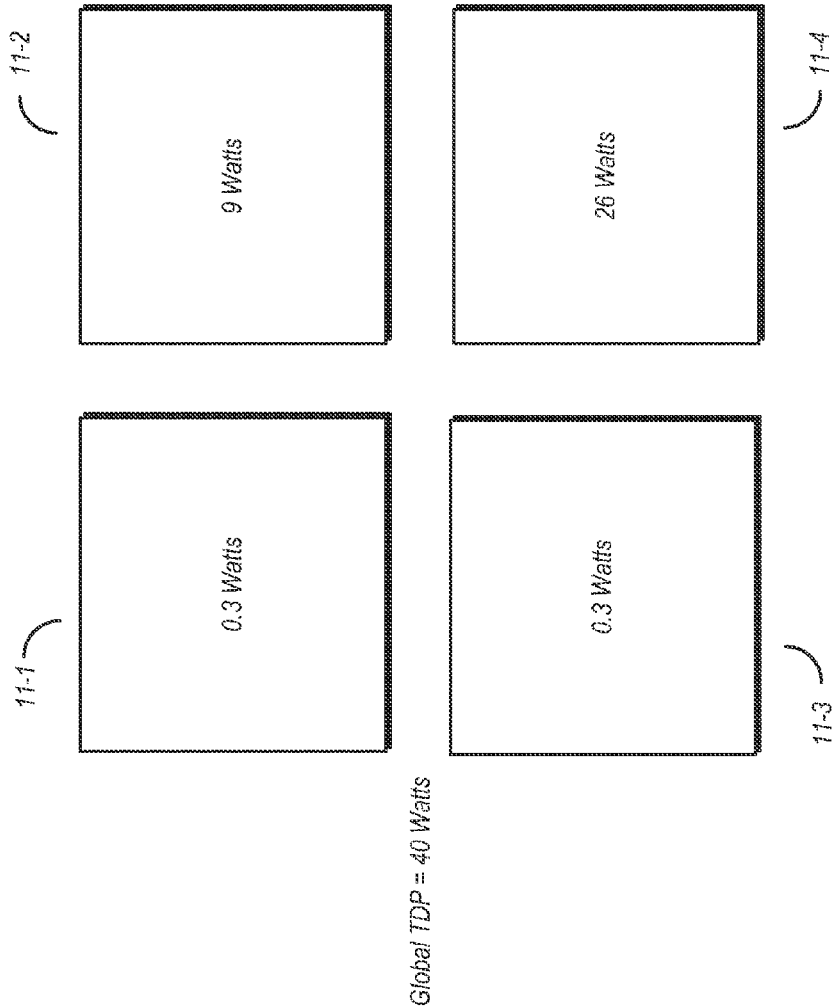
FIG. 3E is a block diagram illustrating thermal design power allocation in a fourth situation for one embodiment of a multi-core processor.

In the example of FIG. 3E, two processor cores 11 are power-gated (i.e. powered down), another processor core 11 is idle (clock-gated), while one processor core 11 is active. The active processor core 11 may be assigned a local power limit of 26 watts, with a maximum clock frequency of 3.9 GHz. It is noted that in this situation, the maximum power consumption adds up to 35.6 watts, which is less than the 40 watt global power limit. This difference may provide a guard band in the case where one of the idle or power-gated processor cores enters an active state due to a wake-up event.

Figure 3F:
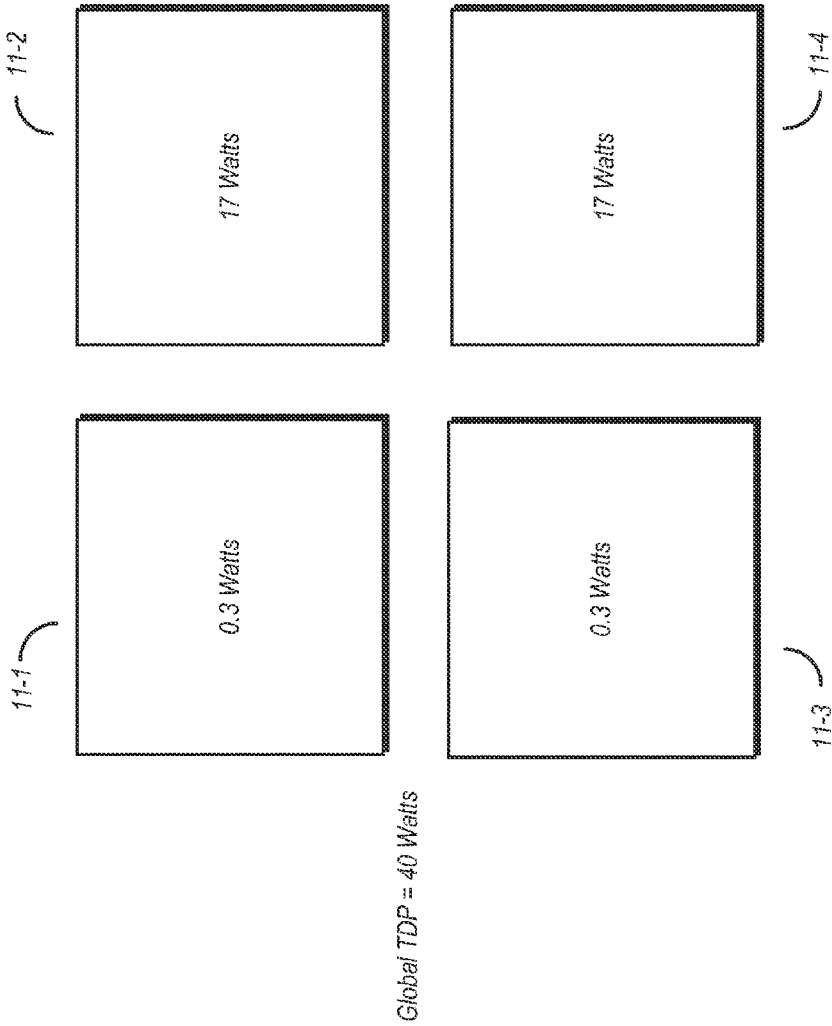
FIG. 3F is a block diagram illustrating thermal design power allocation in a fifth situation for one embodiment of a multi-core processor.

In FIG. 3F, two processor cores 11 are power-gated, while the remaining two are active. In this case, the active processor cores 11 are each assigned a local power limit of 17 watts, with a maximum clock frequency of 3.8 GHz. The maximum power consumption in this case adds up to 34.6 watts, which is again less than 40 watt global power limit. As with the example of FIG. 3E, the difference between the total amount of assigned local power limits and the global power limit may allow a guard band in the case where one of the idle or power-gated processor cores enters an active state due to a wake-up event.

Figure 4:
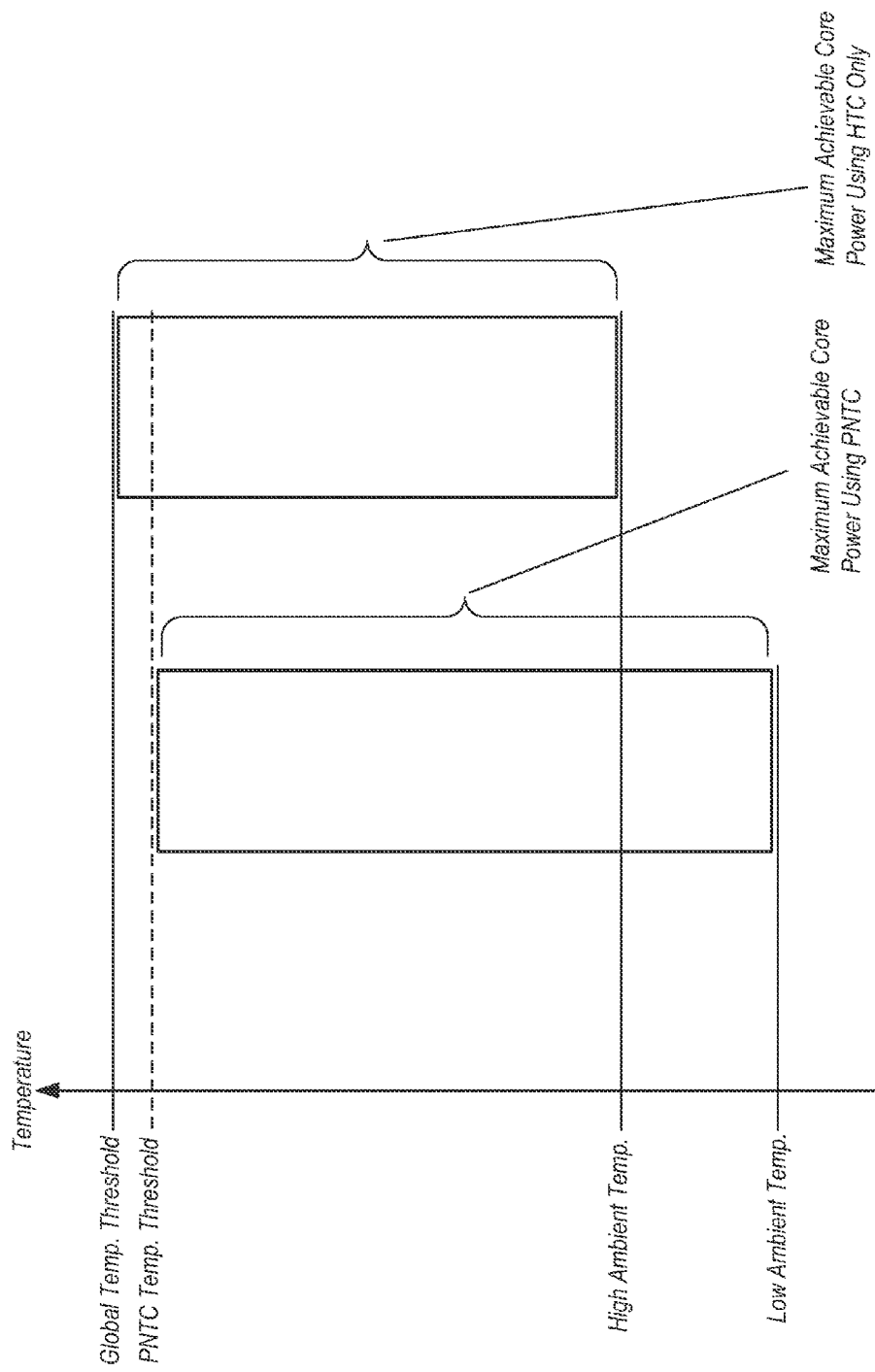
FIG. 4 is a graph illustrating the maximum core power that may be utilized under two different scenarios for one embodiment of a multi-core processor.

FIG. 4 is a graph illustrating the maximum core power that may be utilized under two different scenarios for one embodiment of a multi-core processor. More particularly, FIG. 4 illustrates the difference in maximum core power utilization that is achievable using PNTC, as opposed to an embodiment that utilizes only global HTC. On the left hand side of the graph, the maximum core power for an embodiment configured for PNTC is illustrated. On the right hand side of the graph, the maximum core power for an embodiment configured for HTC only is illustrated. Since the local power limits applied to the processor cores utilizing PNTC is based on a lower ambient temperature than for the global power limit, additional power may be consumed on a per-core basis in the PNTC embodiment. This may in turn allow for performance boosting of the processor cores to utilize the extra power available. As discussed above, this performance boosting may be accomplished by increasing the core clock frequency beyond its maximum frequency of a highest specified operating point (e.g., to a value greater than the maximum frequency specified in the ACPI-compliant embodiment exemplified in Table 1). Increasing the clock frequency in such a manner is known as overclocking. If a workload demand on given processor core justifies such a frequency increase commensurate with overclocking, the processor core may be enabled to execute that workload faster than might otherwise be achievable in an embodiment that relies solely on globally-applied HTC.

Figure 5:
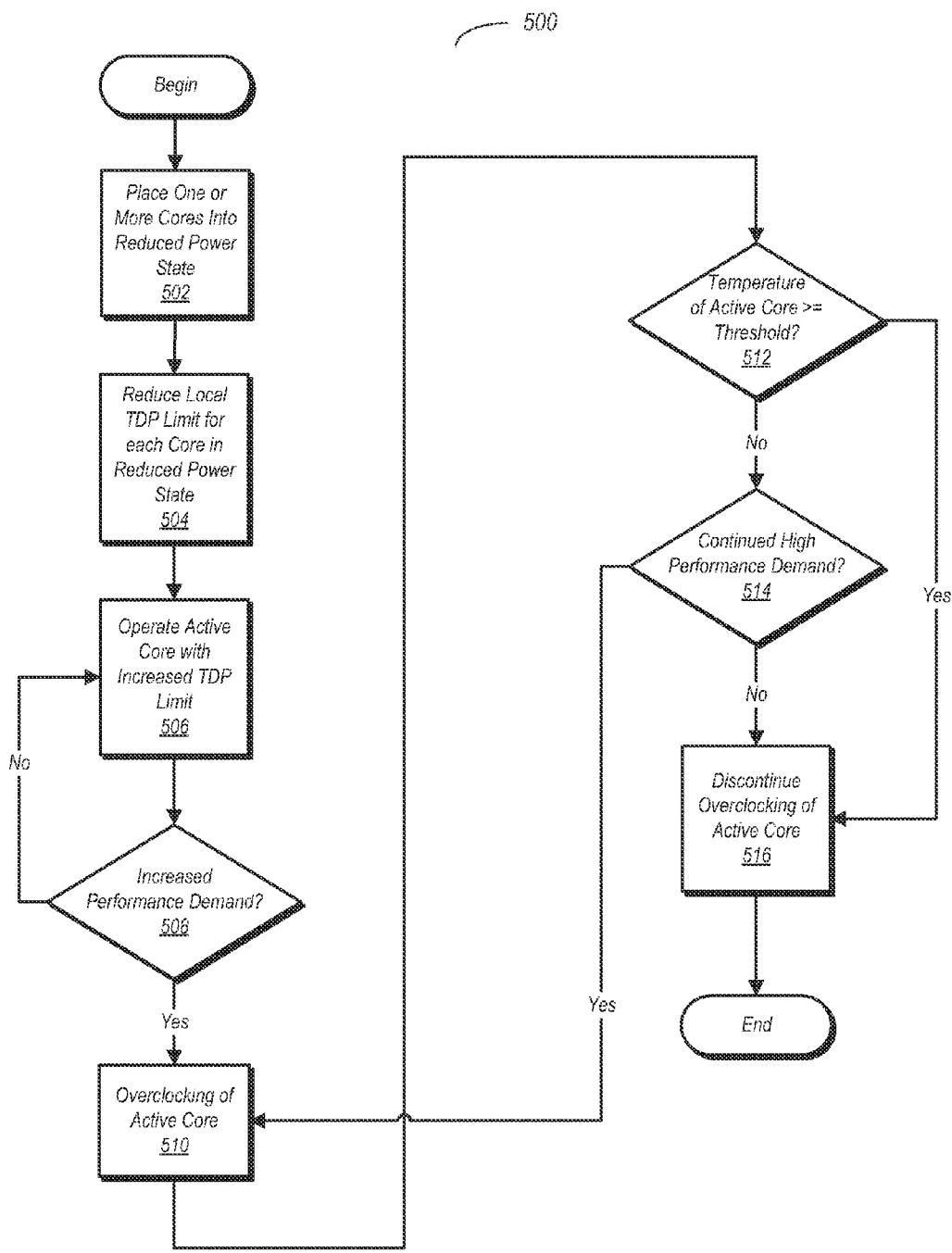
FIG. 5 is a flow diagram of one embodiment of a method for boosting performance of a processor core based on thermal design power (TDP) of individual cores.
Figure 6:
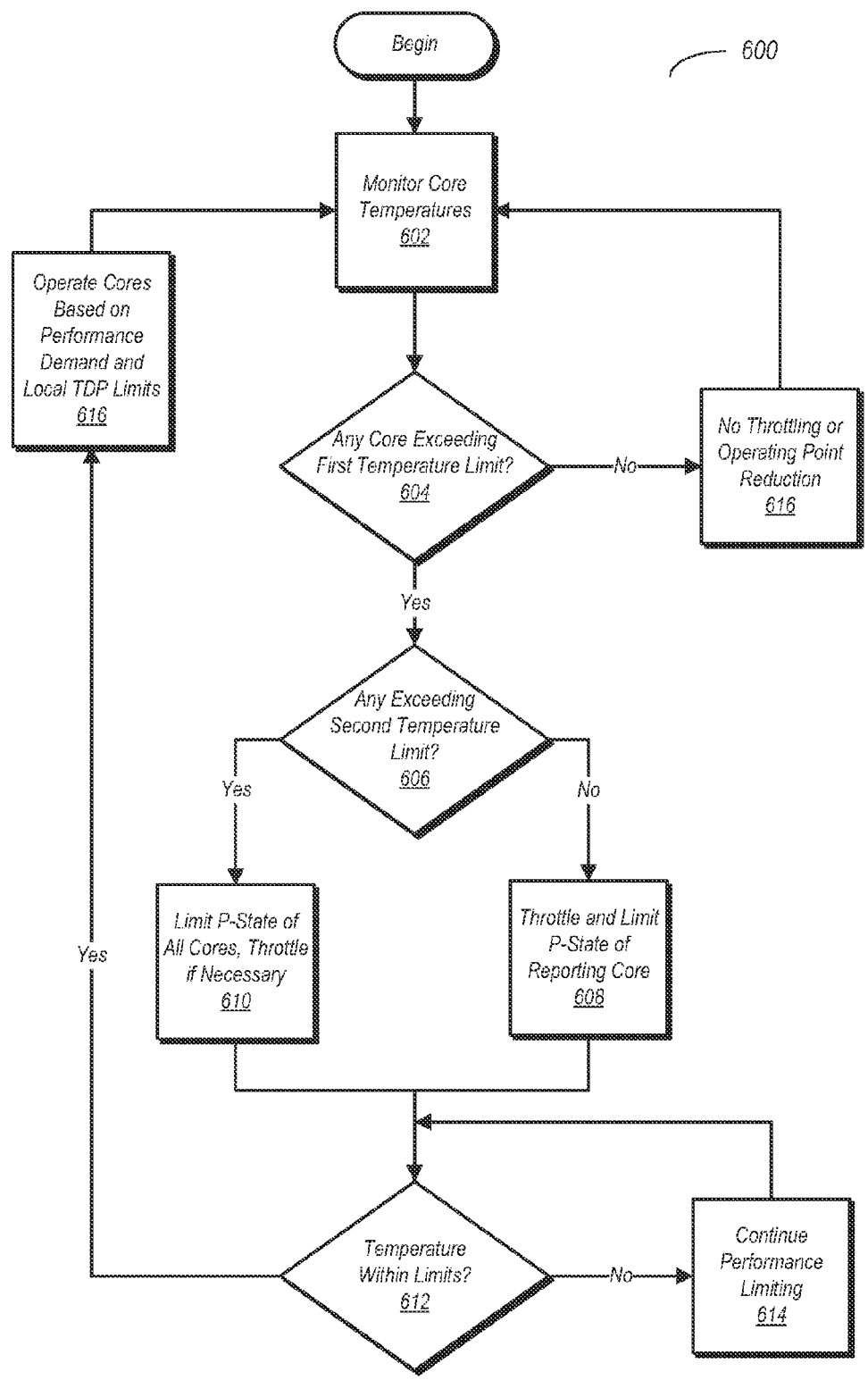
FIG. 6 is a flow diagram of one embodiment of a method for using both per node thermal control and global thermal control.

Method Embodiments:

FIGS. 5 and 6 illustrate embodiments of various methods that may be utilized in a multi-core processor configured for PNTC. FIG. 5 is a flow diagram of one embodiment of a method for boosting performance of a processor core based on a local power limit in a PNTC processor embodiment. FIG. 6 is a flow diagram of one embodiment of a method for using both PNTC and global HTC in a multi-core processor.

Method 500 of FIG. 5 begins with the placing of one or more inactive processor cores into a reduced power state (block 502). The reduce power state may be a clock-gated state or a power-gated state. In the clock-gated state, the clock signal may be inhibited from being provided to the cores placed in the reduced power state, although the operating voltage may continue to be provided. In the power-gated state, neither the clock signal nor operating voltage is provided to the cores placed in a reduced power state. In addition to placing the inactive processor cores in a reduced power state, their respective local power limits may also be reduced (block 504).

One or more processor cores that remain active may each continue to operate with an increased local power limit (block 506). The local power limits for the remaining active processor cores may be increase responsive to the reduction of the local power limits of those cores placed in a reduced power state. If the performance demand for the active core does not increase or is otherwise relatively low (block 508, no), then the cores may continue to operate at their current operating point. However, if the performance demand for a remaining active core increases or is otherwise relatively high (block 508, yes), the increase in the local power limit may allow for increasing the operating point to maximize performance. In the embodiment shown, this may be achieved by overcooking each active core having a high or increased performance demand (block 510). Overclocking may be performed for compute-bounded processor workloads and more generally, for workloads whose performance is sensitive to the core clock frequency.

Overclocking may continue for an active processor core under two conditions. The first of these conditions is that the highest temperature reported for that core remains less than a first temperature threshold that is used for PNTC (e.g., see graph in FIG. 2 above). If the temperature remains below the first threshold (block 512, no), and the performance demand of the processor workload remains high enough to justify the higher operating point (block 514, yes), then overclocking may continue (block 510). If a reported temperature from an overclocking processor core meets or exceeds the first threshold value (block 512, yes) or the workload demand decreases to a point where overclocking provides no performance advantage (block 514), then overclocking may be discontinued (block 516). In the case where overclocking is discontinued due to exceeding the first temperature threshold (block 512, yes), throttling of the reporting core (as described above with reference to FIGS. 1 and 2) may be performed. In one ACPI-compliant embodiment, this throttling may limit the operating point of the reporting core to one having a clock frequency that is 90% that of the P0 state.

The flow diagram of FIG. 5 illustrates a single iteration of the method to which it pertains. However, it is noted that this method may be repeated as many times as necessary during the operation of the processor in which PNTC is utilized.

FIG. 6 is a flow diagram illustrating the use of both PNTC and HTC on the same processor. In the embodiment shown, method 600 begins with the monitoring of reported temperatures for each of a number of processor cores (block 602). The monitoring of reported temperatures may include comparing these values to first and second threshold values, such as those shown in the graph of FIG. 2. If no reported temperature on the IC die is greater than or equal to either of the first and second threshold (block 604, no), then no throttling or other power reduction action is performed (block 616) responsive to the temperature readings. However, it is noted that decreases in respective operating points for the various processor cores may occur responsive to reduced workload demands. Such operating point decreases may include clock-gating and power-gating of the processor cores for which the performance demand is reduced.

If a temperature reported from a given core meets or exceeds the first temperature threshold (block 604, yes), but no core is reporting a temperature meeting or exceeding the second temperature threshold (block 606, no), then the given core may be throttled and its operating point (e.g., P-state) limited (block 608). may be used in performing thermal control on a per node basis (PNTC), while the second temperature threshold may be used in performing thermal control on a global basis (HTC).

In some embodiments, the operating point is limited only for the reporting core. In other embodiments, all cores may be limited in operating point in the same manner as the reporting core. Further still, some embodiments may allow for a partial limiting of the operating point. For example, in an embodiment wherein a voltage plane is shared among all cores, the operating voltage for all cores may be limited to a specified value (e.g., 90% of the operating voltage for the P0 state of FIG. 1), while the clock frequencies for the non-reporting cores are not limited.

If any reported temperature meets or exceeds the second temperature threshold (block 606, yes), then a global throttling and limiting of core operating points may be performed (block 610). Referring again the example of FIG. 2 and Table 1, in one embodiment, the operating point for all cores may be limited to 50% of the clock frequency of the P0 state, i.e. an operating point that corresponds to the P3 state. The operating voltage may be similarly limited to that specified by the P3 state. Those processor cores operating at a clock frequency that is greater than that specified by the P3 state may be throttled responsive to the reported temperature being greater than or equal to the second temperature threshold. Those processor cores operating at a clock frequency and operating voltage equal to or less than that of the P3 state may continue operating at their respective operating points, although these cores may not respond to an increased workload demand by increasing to an operating point higher than the P3 state while the operating points for all cores remain limited.

After reducing the operating point for one processor core (using PNTC) or for all processor cores (using globally applied HTC), the temperatures may continue to be monitored. If the reported temperatures are not below the first and second temperature threshold values (block 612, no), then operating point limiting may continue (block 614). If all temperatures are within limits (block 612, yes), then the processor cores may be operated based on respective performance demands and respective local power limits, without limiting the operating point to a state that is less than the maximum specified.

It is noted however that subsequent to a throttling action responsive to a reported temperature that is greater than or equal to one of the first or second temperature thresholds, operating point limiting may continue for a time thereafter to allow for additional cooling of the IC. An embodiment utilizing a third temperature threshold is thus contemplated. In such an embodiment, the third temperature threshold may be less than either of the first or second temperature thresholds. Subsequent to an operating point reduction utilizing either PNTC or HTC, one or more of the processing cores may continue to be limited until one or more reported temperatures falls below a the third temperature threshold. For example, if a single core is throttled and/or limited in operating point using PNTC responsive to reporting a temperature exceeding the first temperature threshold, that core may continue to be operating point limited until its maximum reported temperature falls below the third threshold.

Figure 7:
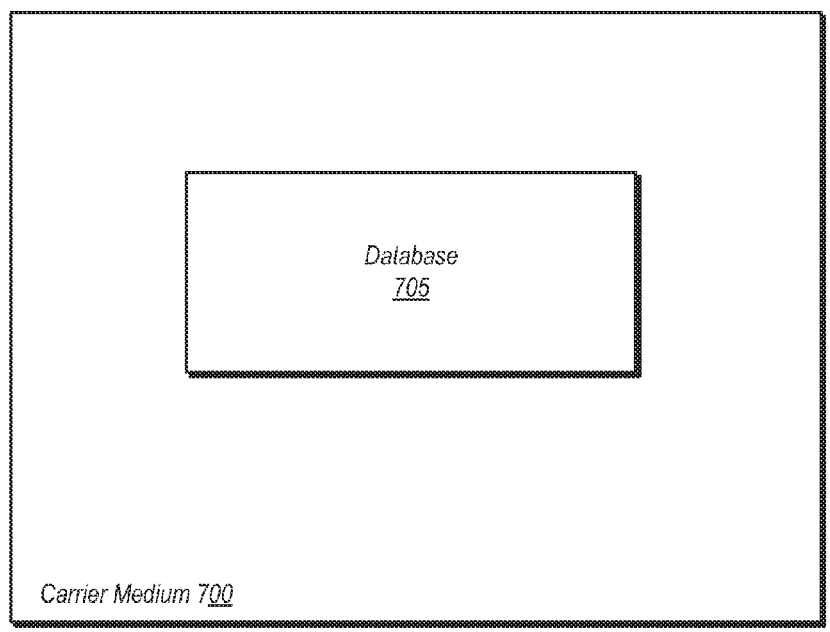
FIG. 7 is a block diagram of one embodiment of a computer readable medium including a data structure describing an embodiment of circuitry including a power management unit.

Computer Accessible Storage Medium:

Turning next to FIG. 7, a block diagram of a computer accessible storage medium 700 including a database 705 representative of the system 10 is shown. Generally speaking, a computer accessible storage medium 400 may include any non-transitory storage media accessible by a computer during use to provide instructions and/or data to the computer. For example, a computer accessible storage medium 400 may include storage media such as magnetic or optical media, e.g., disk (fixed or removable), tape, CD-ROM, or DVD-ROM, CD-R, CD-RW, DVD-R, DVD-RW, or Blu-Ray. Storage media may further include volatile or non-volatile memory media such as RAM (e.g. synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. Storage media may include microelectromechanical systems (MEMS), as well as storage media accessible via a communication medium such as a network and/or a wireless link.

Generally, the data 705 representative of the system 10 carried on the computer accessible storage medium 700 may be a database or other data structure which can be read by a program and used, directly or indirectly, to fabricate the hardware comprising the system 10. For example, the database 705 may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates from a synthesis library. The netlist comprises a set of gates which also represent the functionality of the hardware comprising the system 10. The netlist may then be placed and routed to produce a data set describing geometric shapes to be applied to masks. The masks may then be used in various semiconductor fabrication steps to produce a semiconductor circuit or circuits corresponding to the system 10. Alternatively, the database 705 on the computer accessible storage medium 700 may be the netlist (with or without the synthesis library) or the data set, as desired, or Graphic Data System (GDS) II data.

While the computer accessible storage medium 700 carries a representation of the system 10, other embodiments may carry a representation of any portion of the system 10, as desired, including IC 2, any set of agents (e.g., processing cores 11, I/O interface 13, power management unit 20, etc.) or portions of agents (e.g., thermal control unit 21, etc.).

While the present invention has been described with reference to particular embodiments, it will be understood that the embodiments are illustrative and that the invention scope is not so limited. Any variations, modifications, additions, and improvements to the embodiments described are possible. These variations, modifications, additions, and improvements may fall within the scope of the inventions as detailed within the following claims.

What is claimed is:

1. A system comprising:
    a plurality of processing nodes; and
    a power management unit configured to:
        set a first frequency limit for one of the plurality of processing nodes, independent of other ones of the plurality of processing nodes, responsive to receiving an indication of a first detected temperature being greater than a first temperature threshold, wherein the first detected temperature is associated with the one of the plurality of processing nodes;
        set a second frequency limit for each of the plurality of processing nodes responsive to receiving an indication of a second temperature being greater than a second temperature threshold; and
        cause overclocking of a given processing node responsive to determining the given processing node is processing a first type of workload of at least two types of workloads;
    wherein the first temperature threshold for each of the plurality processing nodes is based on a corresponding local thermal design power (TDP) limit, and wherein the second temperature threshold is based on a global TDP limit, wherein the power management unit is configured to vary the local TDP limit for each of the plurality of processing nodes during operation, and wherein the global TDP limit is fixed during operation;
    wherein the first type of workload is a compute-bounded workload, and wherein the power management unit is configured to set the given processing node to a lower operating point responsive to determining the given processing node is processing a second type of workload, wherein the second type of workload is a memory-bounded workload.

2. The system as recited in claim 1, wherein each of the plurality of processing nodes is configured to operate at one of a plurality of operating points, wherein each of the plurality of operating points comprises a clock frequency and a supply voltage, and wherein the power management unit is further configured to set a first operating point limit for the one of the plurality of processing nodes responsive to receiving an indication of a first detected temperature that is greater than or equal to a first temperature threshold, and further configured to set a second operating point limit for each of the plurality of processing nodes responsive to receiving an indication of a second temperature greater than or equal to a second temperature threshold.

3. The system as recited in claim 2, wherein the first operating point limit comprises an operating point having a first clock frequency that is less than a maximum operating frequency and further comprises a first supply voltage that is less than a maximum supply voltage.

4. The system as recited in claim 3, wherein the second operating point limit comprises an operating point having a second clock frequency that is less than the first clock frequency and a second supply voltage that is less than the first supply voltage.

5. The system as recited in claim 1, wherein the second temperature is greater than the first temperature.

6. The system as recited in claim 1, wherein the power management unit is configured to set the local TDP limit for a given one of the plurality of processing nodes based on respective operating points of one or more additional ones of the plurality of processing nodes.

7. The system as recited in claim 6, wherein the power management unit is configured to increase the local TDP limit for the given processing node responsive to a second processing node entering an idle state, wherein the second processing node is located physically adjacent to the given processing node.

8. The system as recited in claim 1, wherein the global TDP limit is based on a designated ambient temperature value.

9. The system as recited in claim 1, wherein one or more of the plurality of processing nodes is a processor core, and wherein at least one of the processing nodes is a graphics processing unit (GPU).

10. The system as recited in claim 1, wherein the power management unit is configured to set respective operating points for each of the plurality of processing nodes independent of one another.

11. The system as recited in claim 1, wherein the global TDP limit is greater than or equal to a sum of the local TDP limits for the plurality of processing nodes.

12. A method comprising:
    setting a first frequency limit for one of a plurality of processing nodes, independent, of frequency of other ones of the plurality of processing nodes, responsive to receiving an indication of a first detected temperature being greater than a first temperature threshold, the first detected temperature being associated with the one of the plurality of processing nodes;

setting a second frequency limit for each of the plurality of processing nodes responsive to receiving an indication of a second detected temperature being greater than a second temperature threshold; and causing overclocking of a given processing node responsive to determining the given processing node is processing a first type of workload of at least two types of workloads;

wherein the first temperature threshold for each of the plurality processing nodes is based on a corresponding local thermal design power (TDP) limit, and wherein the second temperature threshold is based on a global TDP limit, wherein the method further comprises the power management unit varying the local TDP limit for each of the plurality of processing nodes during operation, wherein the global TDP limit is fixed during operation;

wherein the first type of workload is a compute-bounded workload, the method further comprising setting the given processing node to a lower operating point responsive to determining the given processing node is processing a second type of workload, wherein the second type of workload is a memory-bounded workload.

13. The method as recited in claim 12, wherein the second temperature is greater than the first temperature.

14. The method as recited in claim 12, further comprising operating each of the plurality of processing nodes at one of a plurality of operating points, wherein each of the plurality of operating points comprises a clock frequency and a supply voltage, and wherein the method further includes:

setting a first operating point limit for the one of the plurality of processing nodes responsive to said receiving the indication of the first detected temperature greater than or equal to the first temperature threshold; and setting a second operating point limit for each of the plurality of processing nodes responsive to said receiving the indication of the second detected temperature greater than or equal to the second temperature threshold.

15. The method as recited in claim 14, wherein the first operating point limit comprises an operating point having a first clock frequency that is less than a maximum operating frequency and further comprises a first supply voltage that is less than a maximum supply voltage.

16. The method as recited in claim 15, wherein the second operating point limit comprises an operating point having a second clock frequency that is less than the first clock frequency and a second supply voltage that is less than the first supply voltage.

17. The method as recited in claim 12, further comprising setting the local TDP limit for a given one of the plurality of processing nodes based on respective operating points of one or more additional ones of the plurality of processing nodes.

18. The method as recited in claim 17, further comprising increasing the local power limit for the given one of the plurality of processing nodes responsive to one or more additional ones of the plurality of processing nodes entering an idle state.

19. The method as recited in claim 12, wherein the global TDP limit is based on a designated ambient temperature value.

20. The method as recited in claim 12, wherein one or more of the processing nodes is a processor core, and wherein at least one of the processing nodes is a graphics processing unit.

21. The method as recited in claim 12, further comprising increasing the local TDP limit for the given processing node responsive to a second processing node entering an idle state, wherein the second processing node is located physically adjacent to the given processing node.

22. The method as recited in claim 12, wherein the global TDP limit is greater than or equal to a sum of the local TDP limits for the plurality of processing nodes.

23. A computer readable medium storing a data structure which is operated upon by a program executable on a computer system, the program operating on the data structure to fabricate an integrated circuit including circuitry described by the data structure, the circuitry described in the data structure including:

a plurality of processing nodes; and
a power management unit configured to:
set a first frequency limit for one of the plurality of processing nodes, independent of other ones of the plurality of processing nodes, responsive to receiving an indication of a first detected temperature being greater than a first temperature threshold, wherein the first detected temperature is associated with the one of the plurality of processing nodes;

set a second frequency limit for each of the plurality of processing nodes responsive to receiving an indication of a second temperature being greater than a second temperature threshold; and cause overclocking of a given processing node responsive to determining the given processing node is processing a first type of workload of at least two types of workloads;

wherein the first temperature threshold for each of the plurality processing nodes is based on a corresponding local thermal design power (TDP) limit, and wherein the second temperature threshold is based on a global TDP limit, wherein the power management unit is configured to vary the local TDP limit for each of the plurality of processing nodes during operation, and wherein the global TDP limit is fixed during operation;

wherein the first type of workload is a compute-bounded workload, and wherein the power management unit described in the data structure is configured to set the given processing node to a lower operating point responsive to determining the given processing node is processing a second type of workload, wherein the second type of workload is a memory-bounded workload.

24. The computer readable medium as recited in claim 23, wherein each of the plurality of processing nodes described in the data structure is configured to operate at one of a plurality of operating points, wherein each of the plurality of operating points comprises a clock frequency and a supply voltage.

25. The computer readable medium as recited in claim 24, wherein a first operating point limit comprises the first frequency limit, wherein the clock frequency at the first frequency limit is less than a specified maximum operating frequency, and wherein the first operating point limit further comprises a first supply voltage that is less than a maximum supply voltage, and wherein a second operating point limit comprises an operating point having a second clock frequency that is less than the first clock frequency and a second supply voltage that is less than the first supply voltage.

26. The computer readable medium as recited in claim 23, wherein the power management unit described in the data structure is configured to increase a local TDP limit for the given processing node responsive to a second processing node entering an idle state, wherein the second processing node is located physically adjacent to the given processing node, and further configured to cause overclocking for a selected one of the plurality of processing nodes if its respective local TDP limit is greater than respective local TDP limits for other ones of the plurality of processing nodes.

27. The computer readable medium as recited in claim 23, wherein the data structure comprises one or more of the following types of data:
   HDL (high-level design language) data;
   RTL (register transfer level) data;
   Graphic Data System (GDS) II data.

* * * * *